(12) United States Patent
Sambhy et al.

(10) Patent No.: US 12,247,186 B2
(45) Date of Patent: Mar. 11, 2025

(54) SILICONE FLUID BLEND FOR IMPREGNATING FUSER CLEANING WEB

(71) Applicant: XEROX CORPORATION, Norwalk, CT (US)

(72) Inventors: Varun Sambhy, Pittsford, NY (US); Santokh S. Badesha, Pittsford, NY (US); John R. Lambie, Ontario, NY (US); James Edward Quigley, Manchester, NY (US); David S. Derleth, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 18/225,498

(22) Filed: Jul. 24, 2023

(65) Prior Publication Data

US 2025/0034488 A1      Jan. 30, 2025

(51) Int. Cl.
| | | |
|---|---|---|
| *C11D 7/50* | (2006.01) | |
| *C11D 17/04* | (2006.01) | |
| *G03G 15/20* | (2006.01) | |

(52) U.S. Cl.
CPC .......... *C11D 7/5009* (2013.01); *C11D 17/049* (2013.01); *G03G 15/2025* (2013.01); *G03G 15/2096* (2013.01); *C11D 2111/20* (2024.01)

(58) Field of Classification Search
CPC . C11D 7/5009; C11D 17/049; C11D 2111/20; G03G 15/2025; G03G 15/2096
See application file for complete search history.

(56) References Cited

U.S. PATENT DOCUMENTS

| | | | |
|---|---|---|---|
| 8,092,359 B1 | 1/2012 | Pickering et al. | |
| 10,214,662 B1 | 2/2019 | Sambhy et al. | |
| 2006/0110543 A1 | 5/2006 | Gervasi et al. | |
| 2007/0264059 A1* | 11/2007 | Maeda | G03G 15/2025 |
| | | | 399/327 |
| 2013/0030101 A1 | 1/2013 | Paps et al. | |
| 2019/0317438 A1* | 10/2019 | Sambhy | G03G 15/2025 |

OTHER PUBLICATIONS

Extended European Search Report issued by the European Patent Office for European Application No. 24185728.3 dated Jan. 3, 2025, 9 pages.

* cited by examiner

*Primary Examiner* — Sandra Brase
(74) *Attorney, Agent, or Firm* — MH2 Technology Law Group LLP

(57) ABSTRACT

A fuser fluid composition is disclosed, including a non-fluorinated functional silicone fluid, and a non-fluorinated non-functional silicone fluid, where the non-fluorinated functional silicone fluid is present in the fuser fluid composition in an amount of from about 1 wt % to about 30 wt % based on a total weight of the fuser fluid composition, and the non-fluorinated non-functional silicone fluid is present in the fuser fluid composition in an amount of from about 50 wt % to about 99 wt % based on a total weight of the fuser fluid composition. The non-fluorinated functional silicone fluid may include an amine-functional group. A cleaning web and a fusing subsystem for a printing system may include a material impregnated with the fuser fluid composition.

17 Claims, 2 Drawing Sheets

SILICONE FLUID BLEND FOR IMPREGNATING FUSER CLEANING WEB

TECHNICAL FIELD

The present teachings relate generally to fuser fluids and, more particularly, to fuser fluid blends for fuser cleaning webs.

BACKGROUND

Fuser roll construction including fluoropolymer overcoat on silicone underlayer are also known as Teflon™ over silicone (TOS). A fabric web, which is impregnated with a silicone fluid, rubs against the fuser roll surface to clean it and also provide a thin coating of fuser release fluid. The fabric web is indexed to advance at a set rate and is a consumable component. The current fluid used in certain cleaning web is a fluoro-functional siloxane, known as AKF290 sold by Wacker Silicones (Adrian, MI). Due to European Union (EU) environmental restrictions, the production and sale of AKF290 is being discontinued.

Furthermore, sale of products containing the fluorinated AKF290 will be prohibited in Europe. Hence, finding an alternate fluid for cleaning webs is critical to enable reliable manufacture and sale of machines utilizing such cleaning webs in the future.

Therefore, the need for an alternate non-fluorinated release fuser fluid for a current product line of single, tandem, and magnetic ink character recognition (MICR) printing presses and well as their future upgrades is needed.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A fuser fluid composition is disclosed, including a non-fluorinated functional silicone fluid, and a non-fluorinated non-functional silicone fluid, and where the non-fluorinated functional silicone fluid is present in the fuser fluid composition in an amount of from about 1 wt % to about 30 wt % based on a total weight of the fuser fluid composition, and the non-fluorinated non-functional silicone fluid is present in the fuser fluid composition in an amount of from about 50 wt % to about 99 wt % based on a total weight of the fuser fluid composition. Implementations of the fuser fluid composition include where n is from about 100 to about 10000. The non-fluorinated functional silicone fluid may include an amine-functional group. n can be from about 100 to about 10000. m can be from about 100 to about 1000. A viscosity of the fuser fluid composition can be from about 10 to about 10,000 cP. The non-fluorinated functional silicone fluid is present in the fuser fluid composition in an amount of 90 wt % based on a total weight of the fuser fluid composition, and the non-fluorinated non-functional silicone fluid is present in the fuser fluid composition in an amount of 10 wt % based on a total weight of the fuser fluid composition. A ratio of the non-fluorinated non-functional silicone fluid to the non-fluorinated functional silicone fluid is from about 7 to about 10. A cleaning web for a printing system may include a material impregnated with the fuser fluid composition.

A cleaning web for a printing system is disclosed, where the cleaning web includes a material impregnated with a fuser fluid composition, and a backer roll configured to form a compliant nip between the material and a fuser roll, and where the fuser fluid composition may include a non-fluorinated functional silicone fluid present in the fuser fluid composition in an amount of 90 wt % based on a total weight of the fuser fluid composition, and a non-fluorinated non-functional silicone fluid present in the fuser fluid composition in an amount of 10 wt % based on a total weight of the fuser fluid composition. Implementations of the cleaning web for a printing system include where the non-fluorinated functional silicone fluid may include an amine-functional group.

A fusing subsystem for a printing system is also disclosed, including a fuser roll, which may include a silicone layer disposed on a core and a topcoat may include a fluoropolymer disposed onto the silicone layer. The fusing subsystem also includes a cleaning subsystem which may include a material impregnated with a fuser fluid composition, and a backer roll configured to form a compliant nip between the material and a fuser roll. The fusing subsystem also includes where the fuser fluid composition may include: a non-fluorinated functional silicone fluid present in the fuser fluid composition in an amount of 90 wt % based on a total weight of the fuser fluid composition, and a non-fluorinated non-functional silicone fluid present in the fuser fluid composition in an amount of 10 wt % based on a total weight of the fuser fluid composition. Implementations of the fusing subsystem for a printing system may include where n is from about 100 to about 10000, and m is from about 100 to about 1000. A viscosity of the fuser fluid composition can be from about 10 to about 10,000 cP.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
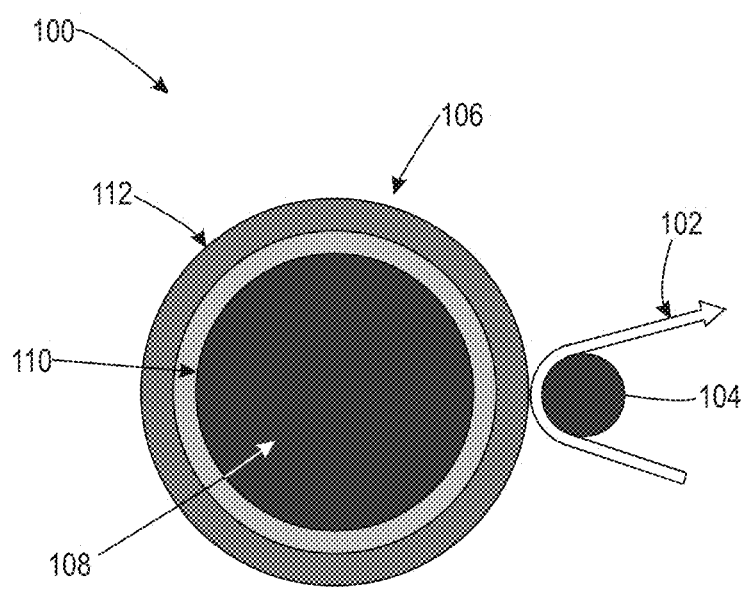
FIG. 1 is a schematic of a fusing subsystem for a printing system, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The present teachings provide blends of a non-functional and amine-functional, non-fluorinated, silicone fluids as replacement for AKF290 additives for Xerox Nuvera® press cleaning webs. Use and application evaluation demonstrates fuser performance with a non-functional and amine-functional blend fluid is as good as or better than AKF290. In addition, blended fluids as provided herein can enable significant cost savings for the consumable fuser web.

A fuser fluid can refer to a polymer-based liquid or fluid that can be used in an electrophotographic printing system as a release agent or release fluid for in a fusing system. A primary example of a polymer-based fuser fluid is a silicone-based fuser fluid. Fuser fluids can be categorized as non-functional or functional. Non-functional fuser fluids can be defined as fuser fluids having an absence of reactive functionality remaining on the polymer chain. A functional fuser fluid, by contrast, can be defined as a fuser fluid having a terminal or pendant chemical or reactive functionality on the polymer chain. Examples of applicable functional fuser fluids include fluoro-functional fuser fluids, amine-functional fuser fluids, mercapto-functional fuser fluids, and the like.

The Xerox Nuvera® fuser roll construction is a Teflon™ overcoat on a silicone underlayer. The Xerox Nuvera® fuser roll is a hard roll with nip compliance provided by a compliant backer roll. A fabric web continuously rubs against the fuser to clean it of any residual toner contaminations. The fabric web is impregnated with a silicone fluid that aids cleaning and provides a very thin layer of oil on Teflon to aid release and/or prevent toner offset to Teflon™ The web is positionally indexed to advance at a set rate and is a consumable product, i.e. can be used and replaced over time. The fuser web moves about 35 microns for each sheet of paper. An exemplary fabric for the web can include, but is not limited to a non-woven aramid fiber having polyester fiber binder. As such, the fabric web may include a non-woven fiber combined with a fiber binder. In illustrative examples, an aramid fiber can be combined with nylon to provide a cleaning web material. Other cleaning web materials can be used, provided they are chemically and physically resistant to components in the fusing subsystem such as the silicone fluid compositions recited herein, at operating temperatures of from about 150° C. to 200° C.

The current fuser fluid used in Xerox Nuvera® press cleaning web is a fluorinated oil known as AKF290 from Wacker Silicones. The production and sale of AKF290 is being discontinued due to EH&S regulatory requirements in Europe. In addition, sale of products containing fluorinated AKF290 will be prohibited in Europe. Hence, finding an alternate fluid for the Xerox Nuvera® press cleaning web is critical to enable reliable manufacture and sale of future printing systems employing this technology. The chemical structure for this fluoro-functional silicone, AKF290 can be depicted as follows:

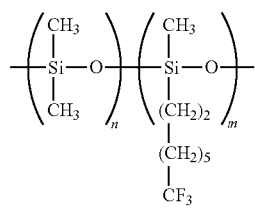

and the pendant tridecafluorooctyl group is present in an amount of 5.7 mol %. To understand mol % consider m=0.057y, n=0.943y, y can be an integer from 1-100,000 based on molecular weight. Thus, the mol % of the pendant F group is 5.7 mol % Ranges of n and m can include n as an integer from 10 to 10000, and m as an integer from 1 to 1000). The fluoro-functional fluid has a nominal viscosity of 290 cP, with a range of from about 10 cP to about 1000 cP.

FIG. 1 is a schematic of a fusing subsystem for a printing system, in accordance with the present disclosure. FIG. 1 depicts a fusing subsystem 100 for use in a printing system, such as, for example, in a Xerox Nuvera® printing press. The fusing subsystem 100 also includes a fuser fluid impregnated fabric web 102 and a compliant backer roll 104 in contact with a backside of the fuser fluid impregnated fabric web 102. The compliant backer roll 104 assists in maintaining a compliant pressure nip between the fuser fluid impregnated fabric web 102 and a fuser roll 106. The fuser roll 106, alternatively a fuser belt or other fuser drum, belt, roller, or other fuser member is composed of a drum core heater 108, with a silicone elastomer underlayer 110 or intermediate layer disposed thereupon. Further disposed upon the silicone elastomer underlayer 110 is a fuser topcoat 112, which can be a topcoat formulation including one or more fluoropolymers, such as Teflon™. This arrangement can alternatively be known as a Teflon™ over silicone (TOS) fuser roll. Alternative examples of a fuser topcoat 112 can include binder polymers or other materials in addition to fluoropolymers.

The present disclosure provides polymeric-based fuser fluid blends including non-functional silicone fluids and amine-functional (non-fluorinated) silicone fluids as replacement materials for the aforementioned fluoro-functional fluids. Blends of these fluids, and other examples, are fabricated by simply mixing various fluids together using an overhead stirrer at room temperatures. Various silicone fluids described herein are completely miscible with each other. Machine testing on relevant printing systems with various blended fluids exhibits fuser performance similar to or better than the AKF290 control example. The chemical structures of some components of an exemplary fuser fluid blend are shown below:

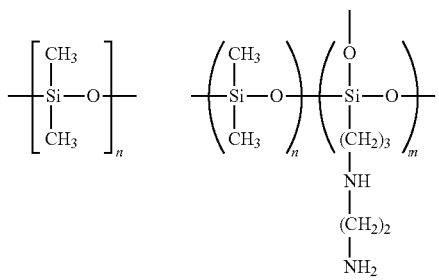

Non-functional silicone fluid Amine-functional silicone fluid

As depicted above, non-functional silicone fluid may also be referred to as a non-fluorinated, non-functional silicone fluid. These non-functional silicone fluids may also be referred to by the abbreviation PDMS, for polydimethylsiloxane. Likewise, the functional silicone fluid may also be referred to as a non-fluorinated, functional silicone fluid. It should be understood by a person skilled in the art that a non-fluorinated non-functional silicone fluid does not contain any fluorine atoms in its chemical structure or composition, and a non-fluorinated functional silicone fluid does not contain any fluorine atoms in its chemical structure or composition.

Additional non-fluorinated, functional silicone fluids can include but are not limited to silicone fluids having a functional group not containing any fluorine atoms, such as hydride-terminated or hydride-pendant functional silicone fluids, including dimethyl hydride, methyl hydride, or combinations thereof. Additional illustrative examples can include mercapto-terminated or mercapto-pendant functional silicone fluids, including functional groups such as (3-mercaptopropyl)trimethoxy-, (3-mercaptopropyl)triethoxy-, 11-mercaptoundecyltrimethoxy-, s-(octanoyl)mercaptopropyltriethoxy-, (mercaptomethyl)methyldiethoxy-, 3-mercaptopropylmethyldimethoxy-, mercaptopropyltrialkoxy-, such as mercaptopropyltrimethoxy-3-mercaptopropyltrimethoxy-, mercaptoundecyltrimethoxy-, (mercaptomethyl)methyldiethoxy-, or combinations thereof. Additional illustrative examples can include amine-terminated or amine-pendant functional silicone fluids. Amine functional groups can further include primary amines, secondary amines, tertiary amines, or combinations thereof.

Examples of amine-functional groups can include 3-aminopropyltrimethoxy-, 3-aminopropyltriethoxy-, 3-aminopropylmethyldimethoxy-, 3-aminopropylmethyldiethoxy-, 3-aminopropyldimethylethoxy-, 3-(2-aminoethylamino)propyltrimethoxy-, 3-(2-aminoethylamino)propyltriethoxy-, 3-(2-aminoethylamino)propyldimethoxymethyl-, 3-(2-aminoethylamino)propyldiethoxymethyl-, 3-[2-(2-aminoethylamino)ethylamino]propyltrimethoxy-, and 3-[2-(2-aminoethylamino)ethylamino]propyltriethoxy-, 3-3-aminopropyltris(2-(2-methoxyethoxy) ethoxy)-, 3-aminopropyltriisopropenyloxy-, 3-aminopropyltri (butanone oximo)-, 4-aminobutyltriethoxy-, N-2-(aminoethyl)-3-aminopropyltris(2-ethylhexoxy)-, 3-aminopropyldimethylethoxy-, 3-aminopropyldiisopropylethoxy-, p-aminophenyltrimethoxy-, m-aminophenyltrimethoxy-, 3-aminopropylphenyldiethoxy-, 3-aminopropyltriethoxy- and 3-aminopropyltrimethoxy-, or combinations thereof.

Additional examples of non-fluorinated non-functional silicone fluids can include fluids having a repeat unit of $Si(CH_3)_2O$—, as depicted schematically herein, in either a linear or branched polymeric structure. The structure, properties, and behavior of branched silicones are known to those skilled in the art.

EXAMPLES

Silicone fluid blends were made by mixing non-functional fluid (AK300, from Wacker Silicones) and amine-functional fluid (Copy Aid, denoted as CA-200 or CA-270), from Wacker Silicones) in various weight ratios, blended together in a vessel using an overhead stirrer. The Copy Aid series of fluids include pendant N-(2-aminoethyl)-3-aminopropylamine functional polydimethylsiloxane with viscosity in range of 10-10000 cP based on the grade or molecular weight of the fluid used.

In the above chemical structures for the non-functional and amine-functional fluids, these silicone fluids have a structure where n=100-10000, m=1 to 1000 and the resulting viscosity of the individual fluids or the blended fluids is from 10 to 10,000 cP. Illustrative examples include n as an integer from 10 to 10000, and m as an integer from 1 to 1000, and viscosity is from about 10 to about 1000 cP.

Exemplary blended fluids were made as shown in Table 1 below. For the silicone fluids mentioned in Table 1, the chemical compositions of the AKF290, non-functional silicone fluids based on polydimethylsiloxane (PDMS), and functional silicone fluids based on polydimethylsiloxane (PDMS) are depicted herein. Fluids designated CA-200 or CA-270 are amine-functional silicone fluids as described previously. It should be noted that in descriptions of viscosity, the units of centiStokes (cSt) are considered as equivalent to centipoise (cP) by those skilled in the art.

TABLE 1

Exemplary blended fuser fluids

| Oil ID | Oil 1 | Oil 2 | Blend Weight Ratio Oil 1/Oil 2 | Amine Amount (mg of KOH used to titrate amine in oil per gram of oil) | Viscosity (cP) |
|---|---|---|---|---|---|
| Comparative Example | AKF290: fluoro-functional, 290 cP | N/A | | 0 | 290 |
| Example 1. EXP 3673: material # 60126891 | 5000 cSt Non functional PDMS | Amine functional PDMS. CA-200 concentrate. #421869, 614 cP, 0.11 meq/g amine | 10:1 | 0.5983 | 3933 |
| Example 2. EXP 3674: material # 60126892 | Non functional PDMS, 300 cSt | Amine functional PDMS. CA-200 concentrate. #421869, 614 cP, 0.11 meq/g amine | 10:1 | 0.5983 | 312 |
| Example 3. EXP 3675: material # 60126893 | Non functional PDMS, 300 cSt | Amine functional PDMS. CA-270, #60053288, 208 cSt/0.00087 mol % amine | 1:1 | 0.3421 | 151 |

TABLE 1-continued

Exemplary blended fuser fluids

| Oil ID | Oil 1 | Oil 2 | Blend Weight Ratio Oil 1/Oil 2 | Amine Amount (mg of KOH used to titrate amine in oil per gram of oil) | Viscosity (cP) |
|---|---|---|---|---|---|
| Example 4. EXP 3676: material # 60126894 | Non functional PDMS, 300 cSt | Amine functional PDMS.CA-270, #60053288, 208 cSt/0.00087 mol % amine | 3:1 | 0.1705 | 211 |

Figure 2:
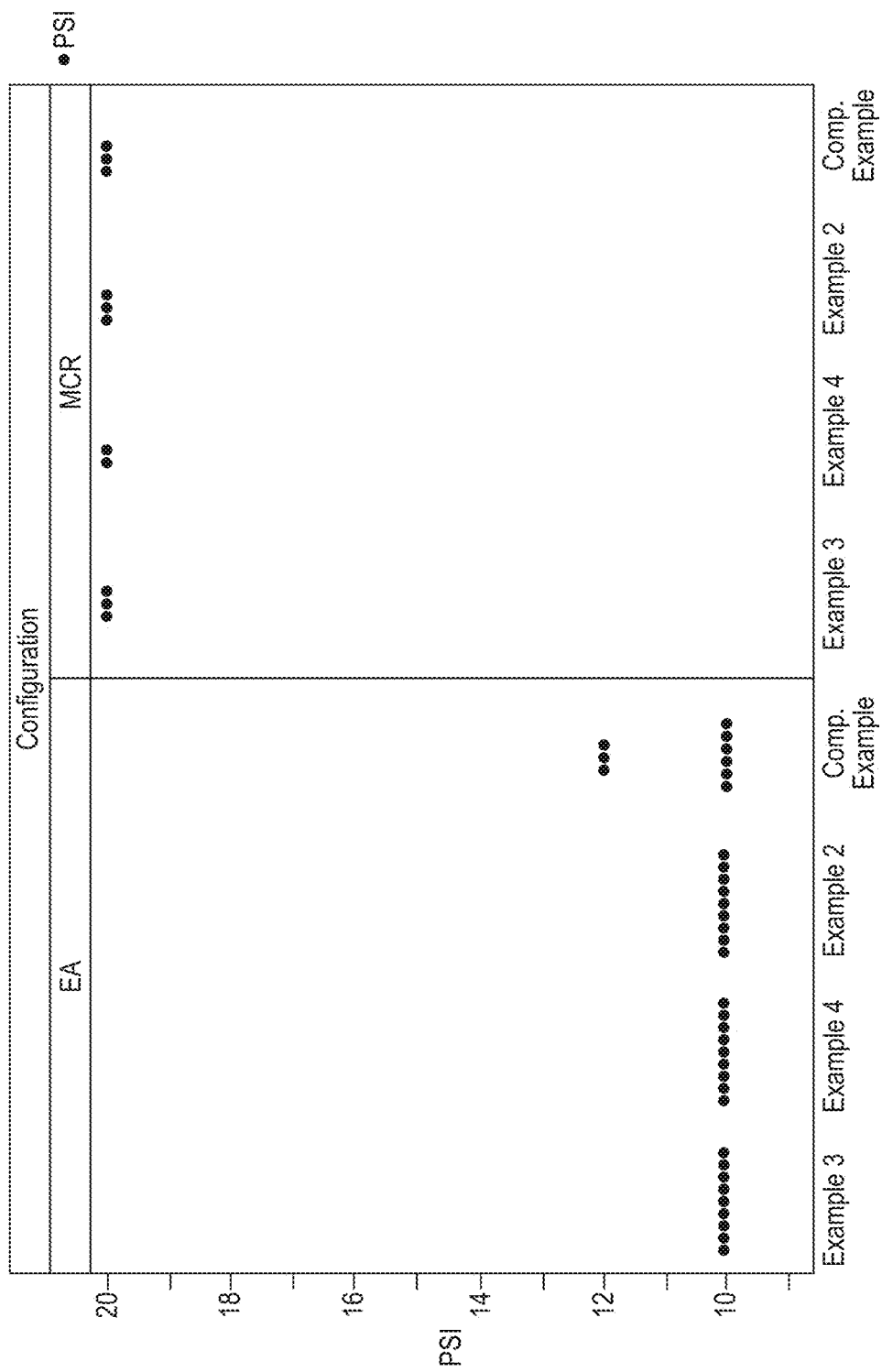
FIG. 2 is a plot depicting stripping performance of various fuser fluid compositions for use in a fusing subsystem for a printing system, in accordance with the present disclosure.

A cleaning web module with various fuser fluid blends as noted in Table 1 were provided by BMP America. Inc. Medina. NY. During web oil loading procedures there was no indication of difference or issues with replacing AKF290 with the experimental fuser fluid blends. This indicates that production capability can be easily transitioned. FIG. 2 is a plot depicting stripping performance of various fuser fluid compositions for use in a fusing subsystem for a printing system, in accordance with the present disclosure. Both Comparative Examples (AKF290) and Example fuser fluid cleaning webs were evaluated on a Xerox Nuvera® press using emulsion-aggregate (EA) and magnetic ink character recognition (MICR) toner. MICR is a stress case test for fusing and cleaning web evaluation and performance. No significant difference in the fuse-fix (image permanence) performance was observed between Comparative Examples (AKF290) and Example fuser fluid blend cleaning webs. The plot in FIG. 2 exhibits stripping performance, as determined by air knife pressure required to strip paper from a fuser using blends of Examples 1-4 showed better performance as compared to the Comparative Example. Blends of Examples 1-4 showed improved, lower air knife pressure, stripping performance as compared to the Comparative Example. The Comparative Example and Examples 1-4 webs also showed similar lifetime to failure in performance testing.

The present disclosure provides amine-functional and non-fluorinated silicone fluid replacement for existing cleaning webs for Xerox Nuvera® printing systems. Experiments exhibit no issues with fabrication, production or incorporation into fuser cleaning web modules as compared to existing materials. Machine performance testing also shows no significant difference between fuse-fix, stripping and lifetime performance between blended fluids and existing fluoro-functional materials. In addition, non-functional and amine-functional silicone blends are expected to be significantly less expensive than existing fluoro-functional materials while meeting current and expected future EH&S requirements in the United States and Europe.

Silicone oils have been known for fusing applications and as release agents, lubrication fluids, and the like. However, previous fusing application uses for silicone oils is related to fluoroelastomer (i.e., Viton™ or FKM) topcoated fusers and with pendant propylamine functional silicone fluid chemistry. Fluorine-based rubbers or fluoro-rubbers are also known by the abbreviation for Fluorine Kautschuk Material, or FKM. The present teachings are specific to—(1) Pendant N-(2-aminoethyl)-3-aminopropyl functional silicone fluids (different chemistry as compared to propylamine funtional silicones) and (2) TOS fusing subsystems (different fusing or printing systems as compared to other subsystems). Without being bound by any particular theory, it is believed that the two nitrogen atoms in the pendant N-(2-aminoethyl)-3-aminopropyl functional silicone fluid enable a stronger non-covalent interaction (i.e., chelation effect) with the Teflon™ surface in the TOS fuser of the present disclosure. The TOS and iGen fusing subsystems are completely different and have different oil requirements. Some of the key differences are noted in Table 2, below.

TABLE 2

Comparison between TOS and FKM based fuser systems

| | TOS | FKM |
|---|---|---|
| Fuser Roll | TeflonTM topcoat on thin silicone underlayer (TOS). Fuser is a Hard roll- nip compliance is through the soft backer roll | Viton ™ or FKM topcoat on thick silicone underlayer. Fuser is a soft roll. Backer roll is hard. |
| Topcoat chemistry | TOS. No significant chemical bonding interaction with oil. Oil wets/spreads/adheres to roll via non-covalent interactions. | Viton ™ or FKM. Amine groups in oil covalently bond/anchor to Viton ™ or FKM. |
| Oil Delivery | An oil impregnated fabric web applies oil to fuser roll. | Donor roll/RAM system. The donor roll dips in oil reservoir and applies oil to fuser roll. |
| Cleaning/ | Oil impregnated web acts as a cleaner system to remove stray toner from fuser roll. The web is indexed at set intervals to maintain clean surface. | Two external heat rolls (aluminum) contacting the fuser act as cleaners to clean stray toner. |

TABLE 2-continued

Comparison between TOS and FKM based fuser systems

| | TOS | FKM |
|---|---|---|
| Oil Property requirement | Oil needs to wet/spread/adhere to extremely low surface energy, non-stick, TOS surface. Very little amount of oil is transferred from web to roll. The oil should have properties such that the web is able to pick up any stray toner and clean the roll. Simple release action of the oil will not satisfy this critical property requirement. For example, it is not desirable for the oil to act as a release agent on the web - it will release the toner back to the roll. | Viton ™ or FKM has a different chemistry than TOS. Wetting/spreading/adhesion properties of oil on Viton ™ or FKM are different than on TOS. FKM roll has significantly greater (~10X) amounts of oil on the roll. Oil on FKM roll is purely for release purposes, i.e., it is desired that the toner release cleanly from the roll. |

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A fuser fluid composition, comprising:
a non-fluorinated functional silicone fluid; and
a non-fluorinated non-functional silicone fluid; and
wherein:
the non-fluorinated functional silicone fluid is present in the fuser fluid composition in an amount of from about 1 wt % to about 30 wt % based on a total weight of the fuser fluid composition;
the non-fluorinated non-functional silicone fluid is present in the fuser fluid composition in an amount of from about 50 wt % to about 99 wt % based on a total weight of the fuser fluid composition; and
the non-fluorinated non-functional silicone fluid comprises a chemical structure of:

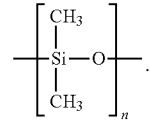

2. The fuser fluid composition of claim 1, wherein n is from about 100 to about 10000.

3. The fuser fluid composition of claim 1, wherein the non-fluorinated functional silicone fluid comprises an amine-functional group.

4. The fuser fluid composition of claim 1, wherein the non-fluorinated functional silicone fluid comprises a chemical structure of:

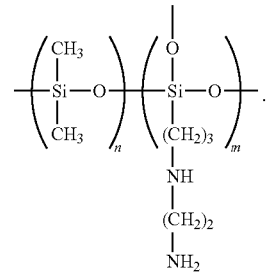

5. The fuser fluid composition of claim 4, wherein n is from about 100 to about 10000.

6. The fuser fluid composition of claim 4, wherein m is from about 100 to about 1000.

7. The fuser fluid composition of claim 1, wherein a viscosity of the fuser fluid composition is from about 10 to about 10,000 cP.

8. The fuser fluid composition of claim 1, wherein:
the non-fluorinated functional silicone fluid is present in the fuser fluid composition in an amount of 10 wt % based on a total weight of the fuser fluid composition; and
the non-fluorinated non-functional silicone fluid is present in the fuser fluid composition in an amount of 90 wt % based on a total weight of the fuser fluid composition.

9. The fuser fluid composition of claim 1, wherein a ratio of the non-fluorinated non-functional silicone fluid to the non-fluorinated functional silicone fluid is from about 7 to about 10.

10. A cleaning web for a printing system, comprising a material impregnated with the fuser fluid composition of claim 1.

11. A cleaning web for a printing system, comprising:
a material impregnated with a fuser fluid composition; and
a backer roll configured to form a compliant nip between the material and a fuser roll; and
wherein the fuser fluid composition comprises:
a non-fluorinated functional silicone fluid present in the fuser fluid composition in an amount of 90 wt % based on a total weight of the fuser fluid composition; and
a non-fluorinated non-functional silicone fluid present in the fuser fluid composition in an amount of 10 wt % based on a total weight of the fuser fluid composition; and
the non-fluorinated non-functional silicone fluid comprises a chemical structure of:

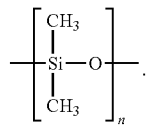

12. The cleaning web for a printing system of claim 11, wherein the non-fluorinated functional silicone fluid comprises an amine-functional group.

13. The cleaning web for a printing system of claim 11, wherein the non-fluorinated functional silicone fluid comprises a chemical structure of:

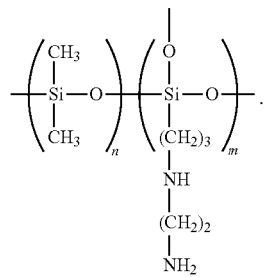

14. A fusing subsystem for a printing system, comprising:
a fuser roll, comprising a silicone layer disposed on a core and a topcoat comprising a fluoropolymer disposed onto the silicone layer;
a cleaning subsystem comprising:
a material impregnated with a fuser fluid composition; and
a backer roll configured to form a compliant nip between the material and a fuser roll; and
wherein the fuser fluid composition comprises:
a non-fluorinated functional silicone fluid present in the fuser fluid composition in an amount of 90 wt % based on a total weight of the fuser fluid composition; and
a non-fluorinated non-functional silicone fluid present in the fuser fluid composition in an amount of 10 wt % based on a total weight of the fuser fluid composition; and
the non-fluorinated non-functional silicone fluid comprises a chemical structure of:

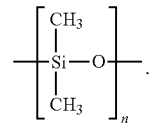

15. The fusing subsystem for a printing system of claim 14, wherein the non-fluorinated functional silicone fluid comprises a chemical structure of:

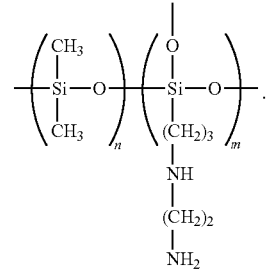

16. The fusing subsystem for a printing system of claim 15, wherein:
n is from about 100 to about 10000; and
m is from about 100 to about 1000.

17. The fusing subsystem for a printing system of claim 14, wherein a viscosity of the fuser fluid composition is from about 10 to about 10,000 cP.

* * * * *